United States Patent
Heindl

(10) Patent No.: US 9,903,391 B2
(45) Date of Patent: Feb. 27, 2018

(54) SYSTEM FOR STORING POTENTIAL ENERGY AND METHOD FOR PRODUCING SUCH A SYSTEM

(75) Inventor: Eduard Heindl, Furtwangen (DE)

(73) Assignee: Heindl Energy GmbH, Stuttgart (DE)

( * ) Notice: Subject to any disclaimer, the term of this patent is extended or adjusted under 35 U.S.C. 154(b) by 1106 days.

(21) Appl. No.: 13/811,987

(22) PCT Filed: Aug. 5, 2011

(86) PCT No.: PCT/EP2011/003933
§ 371 (c)(1),
(2), (4) Date: Mar. 22, 2013

(87) PCT Pub. No.: WO2012/022439
PCT Pub. Date: Feb. 23, 2012

(65) Prior Publication Data
US 2013/0174725 A1 Jul. 11, 2013

(30) Foreign Application Priority Data
Aug. 19, 2010 (DE) .................. 10 2010 034 757

(51) Int. Cl.
*F15B 1/04* (2006.01)
*F03B 17/00* (2006.01)
(Continued)

(52) U.S. Cl.
CPC ................ *F15B 1/045* (2013.01); *E21D 9/00* (2013.01); *E21D 9/006* (2013.01); *F03B 17/00* (2013.01);
(Continued)

(58) Field of Classification Search
CPC .. F15B 1/045; F03G 3/00; Y02E 10/20; H02J 15/003; F03B 17/00; E21D 9/00; E21D 9/006
See application file for complete search history.

(56) References Cited

U.S. PATENT DOCUMENTS 6,996,937 B2 2/2006 Halloran
8,166,760 B2 5/2012 Fiske
(Continued)

FOREIGN PATENT DOCUMENTS

CN 1687563 A 10/2005
DE 3511932 A * 10/1986
(Continued)

OTHER PUBLICATIONS

"Pumpspeicherkraftwerk (Pumped-storage hydroelectricity)," Wiki page, <<http://de.wikipedia.org/wiki/Pumpspeicherkraftwerk>>, viewed Jan. 15, 2013, 5 pp. (with English translation, 3 pp.).
(Continued)

*Primary Examiner* — F. Daniel Lopez
*Assistant Examiner* — Abiy Teka
(74) *Attorney, Agent, or Firm* — Muirhead and Saturnelli, LLC

(57) ABSTRACT

A system for storing potential energy includes a hydraulic cylinder, a mass to be lifted, and a sealing ring at the edge of the mass to be lifted. The mass to be lifted is a solid rock mass in the form of a cut-out solid rock. The hydraulic cylinder is formed by the cavity between surrounding rocks and the cut-out solid rock. The cavity is sealed with respect to the surrounding rocks by the sealing ring. A method for producing such a system is also provided.

11 Claims, 5 Drawing Sheets

(51) Int. Cl.
　　　*H02J 15/00*　　　(2006.01)
　　　*F03G 3/00*　　　(2006.01)
　　　*E21D 9/00*　　　(2006.01)
(52) U.S. Cl.
　　　CPC .............. *F03G 3/00* (2013.01); *H02J 15/003* (2013.01); *Y02E 10/20* (2013.01); *Y02E 60/17* (2013.01)

(56) References Cited

U.S. PATENT DOCUMENTS

2005/0224400 A1\*　10/2005　Wong .................... B01D 61/06
　　　　　　　　　　　　　　　　　　　　　　　　　　　　210/137
2009/0193808 A1　　8/2009　Fiske

FOREIGN PATENT DOCUMENTS

| DE | 10037678 A1 * | 2/2002 | ............... F03G 3/00 |
| DE | 10 2007 057 323 A1 | 6/2009 | |
| DE | 10 2007 062 672 A1 | 8/2009 | |
| DE | 102007062672 A1 * | 8/2009 | ............ F03B 13/187 |
| DE | 10 2008 006 897 A1 | 10/2009 | |
| JP | 2006-132323 | 5/2006 | |
| WO | WO 2004/002897 A1 | 1/2004 | |

OTHER PUBLICATIONS

PRWeb, "Gravity Power LLC Emerges from Stealth Mode to Announce Its New Grid-Scale Electricity Storage System", Sep. 30, 2009, 3 pages.

\* cited by examiner

SYSTEM FOR STORING POTENTIAL ENERGY AND METHOD FOR PRODUCING SUCH A SYSTEM

TECHNICAL FIELD

This application is directed to the field of storing potential energy.

BACKGROUND OF THE INVENTION

It is known that energy can be stored by lifting masses. The best known methods are pumped storage hydropower stations, in which water is pumped up from a reservoir to a higher level. When required the energy can be converted back again into electrical energy by letting out the water with an interposed turbine. This method has the disadvantage that a storage basin is required high up, which requires a considerable amount of space, and that suitable sites only exist in mountainous areas. A good overview of this technology is found on the internet site http://de.wikipedia.org/wiki/Pumpspeicherkraftwerk (pumped storage hydropower station).

An alternative is lifting buildings with a hydraulic system, such as described in the patent specification "Potential Energy Storage System", U.S. Pat. No. 6,996,937 B2. The disadvantage here is the high technical expense in the building construction and the comparatively low amount of energy which can be stored in relation to the outlay. Comparable proposals, to lift masses with cranes, such as described in patent application DE 10 2007 057 323 A1, or to move masses over rails to higher locations, incur high costs per stored energy unit and high wear on the systems.

The system described herein is concerned with the problem of providing a system for storing potential energy and a method for producing such as system, which is suitable for storing large amounts of energy, up in the order of the daily requirement of a country such as Germany and entails low costs per stored energy unit and low wear on the system.

SUMMARY OF THE INVENTION

A system according to the invention for storing potential energy has a hydraulic cylinder, a mass to be lifted and a sealing ring at the edge of the mass to be lifted, so that it is ensured that the interspace between the mass to be lifted and the inside wall of the hydraulic cylinder facing same is sealed at at least one place against any passage of hydraulic fluid, here in particular water. The mass to be lifted thus forms a piston which is guided in the hydraulic cylinder. It is additionally pointed out here that the hydraulic cylinder can also have a cross-section which deviates from the circular shape. Advantageously however there is a constant cross-sectional shape seen over the length of the hydraulic cylinder in the direction between the earth's surface and the earth's center, in order to prevent as much as possible any canting of a mass to be lifted in the hydraulic cylinder.

It is desirable for the system described herein that the mass to be lifted is a solid rock mass which is represented by a cut-out solid rock, that the hydraulic cylinder is formed by the cavity between the surrounding rocks and the cut-out solid rock and that the cavity is sealed from the surrounding rocks by the sealing ring. Thus as opposed to known systems for storing potential energy, a situation is provided in which the mass to be lifted and the hydraulic cylinder are "worked out from the solid".

When in the following the terms "top" and "bottom" are used in connection with the hydraulic cylinder and/or the mass to be lifted, "bottom" is to mean the side facing the earth's center and "top" is to mean the side opposite this side.

In a particularly advantageous embodiment of the invention any possible density fluctuations of the material inside the volume of the mass to be lifted, which are conceivable in the case of natural rocks, are compensated by arranging ballast means, which are arranged on the end side of the mass to be lifted, which faces the atmosphere, i.e. the upper side, which originally has formed a part of the earth's surface. More particularly water tanks can be used as ballast means. In this way any tilting of the mass to be lifted in the hydraulic cylinder, which could prevent the movement of the cylinder, can be avoided.

A particularly good seal is achieved in a system for storing potential energy, wherein the sealing ring is formed by a cone which surrounds the circumference of the mass to be lifted and in which a cylindrical articulated joint is inserted which supports a lamella plate which is provided with a sealing bead. Through the pressure of a hydraulic fluid the sealing bead is thus pressed against the surface of the wall of the hydraulic cylinder, with the result that a seal is obtained. As a result of a particularly good seal at high pressures, an embodiment is thereby particularly preferred in which a dense flexible material is attached to the underneath of the lamella plate and closes positively with the sealing bead and the mass to be lifted.

Lifting and lowering of the mass to be lifted can take place with particularly low friction if the sealing ring is arranged at the halfway working height so that a rolling sealing ring is provided.

The method according to the invention for producing a system for storing potential energy comprises at least the following steps:

a) Sinking a shaft, which has at least a depth H, below the earth's surface. The depth H thereby corresponds roughly to the length extension of the mass to be lifted in the working direction, thus in the direction between the earth's surface and the earth's center. More particularly, this shaft, which is to serve as a supply and transport shaft for subsequent works, will in general advantageously lie outside of the area which later forms the mass to be lifted. The depth H need not necessarily be reached in one single sinking step, but it is also conceivable that after sinking one part further method steps can be carried out before or at the same time as sinking a further part. Naturally several such shafts can also be sunk, by way of example to reduce transport routes.

b) Driving forward at least one first horizontal gallery at the depth H up to the point where the wall of a hydraulic cylinder is to be located.

c) Driving a first tunnel, which is closed per se, i.e. the beginning and end of which merge into one another, into the mountain, starting from the point of the first horizontal gallery where the wall of the hydraulic cylinder is to be located. This first tunnel advantageously provides the subsequent circumferential line of the hydraulic cylinder.

d) Sinking at least one bore from the earth's surface to the depth H, wherein the bores are positioned so that they each run perpendicular to the first tunnel from the earth's surface to the first tunnel. These bores can be used in the following steps as the starting points for sawing out the mass to be lifted and the thus simultaneously evolving production of the hydraulic cylinder from its wall surface.

e) Introducing at least one stone saw into the bores.

f) Sawing out at least one section of the wall of the hydraulic cylinder with the stone saw between the earth's surface and the tunnel.

The steps d) to f) thus serve to produce the side surfaces of the hydraulic cylinder and the mass to be lifted.

g) Guiding horizontal bore holes starting from the tunnel into the center of the hydraulic cylinder.

h) Breaking down the rocks at the bottom of the hydraulic cylinder, so that there is no longer any fixed mechanical connection between the cylinder base and the lifting piston.

With steps g) and h) the base surface (thus the underneath) of the hydraulic cylinder and the mass to be lifted is produced.

i) Driving a tunnel section forward between a fluid reservoir and the bottom of the hydraulic cylinder, so that fluid can be supplied into the hydraulic cylinder.

j) Fastening a sealing ring on the mass to be lifted.

k) Closing off the first horizontal gallery in a watertight manner.

The steps of the method can be undertaken in the given sequence, but it is also possible to undertake the method steps in parallel with one another. As a rule parallelization is desirable owing to the resulting time gain, but it does require a heavier use of resources.

In an advantageous development of the method at least one further horizontal gallery is driven forward at a depth which is less than H, and is driven up to the point where the wall of the hydraulic cylinder is to be located. A further tunnel, which is closed per se, is then driven into the mountain, starting from the point of the first horizontal gallery where the wall of the hydraulic cylinder is to be located, and the further horizontal gallery is closed off in a watertight manner. The maximum depth of the hydraulic cylinder which can be achieved, and which is restricted by the performance of the stone saws, can thereby be increased.

Parallelization of the work steps can be achieved in particular if, when carrying out the steps e) and f), several stone saws are used in different holes at the same time.

Blasting is a particularly simple method for executing the step h).

It is particularly desirable to obtain the most homogeneous weight distribution possible of the mass to be lifted. It is therefore expedient to undertake measuring the surface of the mass to be lifted which is obtained by the method, by using a gravimeter.

The system described herein is based on the basic idea that a large solid rock mass is lifted by a hydraulic system, wherein the mass to be lifted is represented by a preferably cylindrically cut-out solid rock. The hydraulic cylinder is the resulting cavity formed between the surrounding rocks and the cut-out solid rock. This cavity is sealed off with respect to the surrounding rocks by a sealing ring on the edge of the mass to be lifted. The cavity is filled with water from a reservoir by means of a high pressure pump and a connecting gallery between the pump and the cavity. The solid rock mass is thereby lifted as a result of the water pressure and thus stores potential energy (elevation energy). This potential energy can be removed when required by directing the pressurized water via the connecting gallery and via a turbine, as is usual in pumped storage hydropower stations. Power is conventionally obtained from the rotational energy of the turbine via a generator and forwarded.

An advantage of the system described herein lies in particular in the fact that the cut-out solid rock mass increases by the third power of the system radius, the cut surface, which causes the main production costs, increases however only by the second power of the system radius.

This follows from the equation for the curved surface area M of a cylinder, whose height h corresponds to the cylinder diameter:

$$M = 2*\pi*r*h = 4*\pi*r^2 \quad (1)$$

The amount of stored energy on the other hand increases with the fourth power of the system radius. This is because the possible lift height likewise increases proportionally to the system radius.

The maximum stored energy is calculated from the density of the rocks $\rho_1$ and the effective density $\rho_2$, which is to be taken into consideration on the basis of the hydrostatic situation, since water with the density $\rho_3$ replaces the rock mass. The effective density is thus:

$$\rho_2 = \rho_1 - \rho_3 \quad (2)$$

The equation for the potential energy E with a lift height D in the gravity field of the earth with the drop constant g for a mass m is $$E = g*m*D \quad (3)$$

The effective mass of a cylinder is calculated according to $$m = \pi*r^2*h*\rho_2 \quad (4)$$

Equation (4) used in equation (3), taking into account that D=r:

$$E = g*\pi*r^2 2*r*\rho_2*r \quad (5)$$

Equation (5) summarized as:

$$E = g*\rho_2*2*\pi*r^4 \quad (6)$$

Wherein it is shown that in this system the stored energy increases proportional to the fourth power of the system radius.

The system radius is, in the simple case of a cylindrical mass to be lifted, the radius r of the cylinder, the height h of the cylinder is to correspond to the cylinder diameter d (d=2*r). The seal has a length L, which is proportional to the system radius (L=2*π*r), and therefore in the case of large systems does not turn out to be particularly large in comparison with the other elements.

BRIEF DESCRIPTION OF THE DRAWINGS

Embodiments of the system described herein will now be explained in further detail with reference to figures. In the figures.

The same component parts having identical designs are provided with the same reference numerals in all the figures unless mentioned otherwise.

DETAILED DESCRIPTION OF VARIOUS EMBODIMENTS

Figure 1:
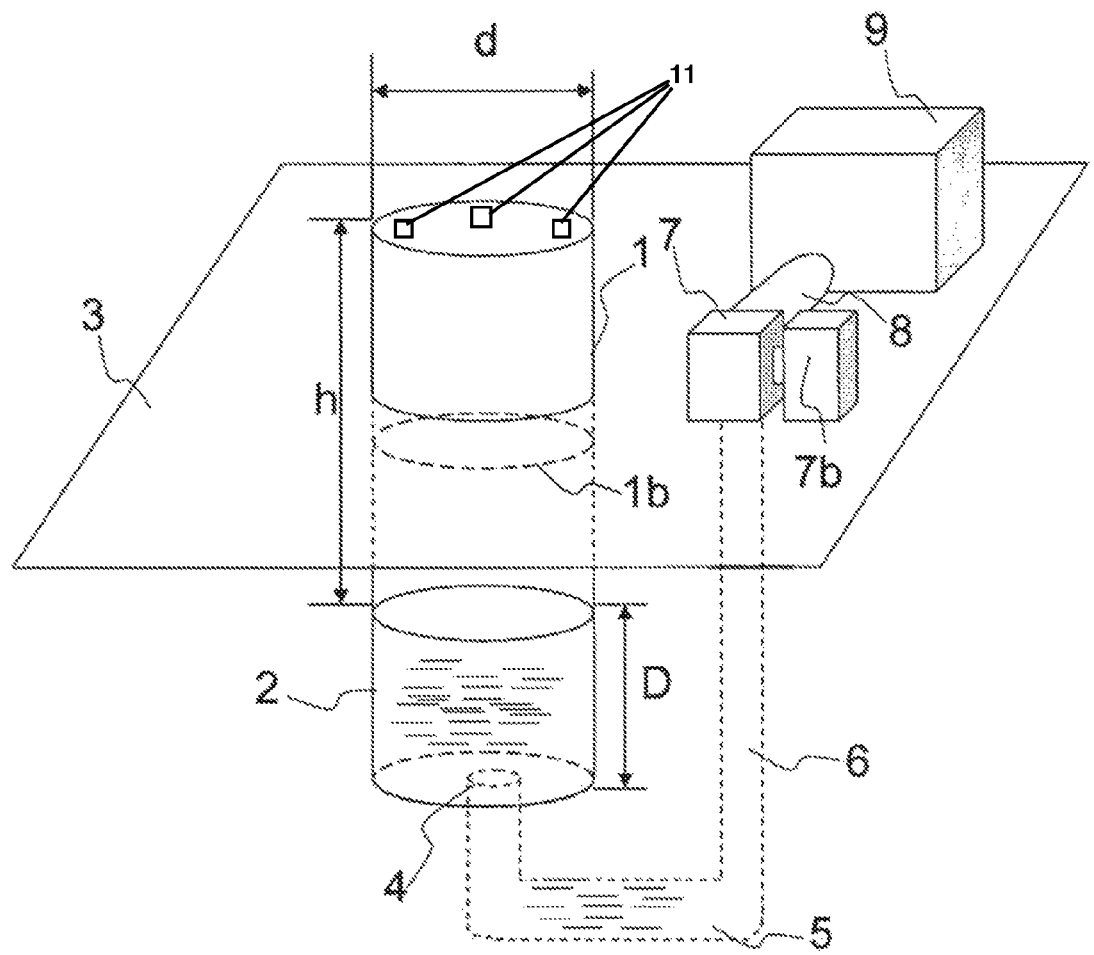
FIG. 1: shows an embodiment of a system for storing potential energy.

An embodiment of the invention is illustrated in Drawing 1 and will be described in further detail below. In the case of the illustrated system for storing potential energy 10 a lifting piston 1 cut out from the solid rock and having the diameter d is guided in a cylinder 2, which was formed by cutting the lifting piston 1 out from the solid rock. A seal 1b is fitted halfway up the section h, thus at the height h/2, between the lifting piston 1 formed by the mass to be lifted which is cut from the rock, and the cylinder 2 which serves as the hydraulic cylinder. Water is supplied by a pump 8 from the reservoir 9 from below into the cylinder 2 at the point 4 via a pipe system 5 and 6. The surface area 3 is to represent the earth's surface. If the lifting piston is located in the raised position (lift height) D, then water can flow back at any time by way of the hydrostatic pressure via a turbine 7 into the reservoir 9 and thereby produce power in a generator 7b. Water tanks 11 may be provided on a top portion of the piston 1 to provide ballast that inhibits tilting of the piston 1.

The amount of energy E which can be stored depends on the lift height D and the effective mass m of the cylinder 2 by way of the simple equation: E=g*D*m, in which g is the gravitational acceleration with 9.81 N/kg.

In order to store large amounts of energy the mass m must be selected to be as large as possible. The lift height D cannot be selected at will since it has to be smaller than half the cylinder length h, since otherwise it may result in tilting of the lifting piston.

Figure 2:
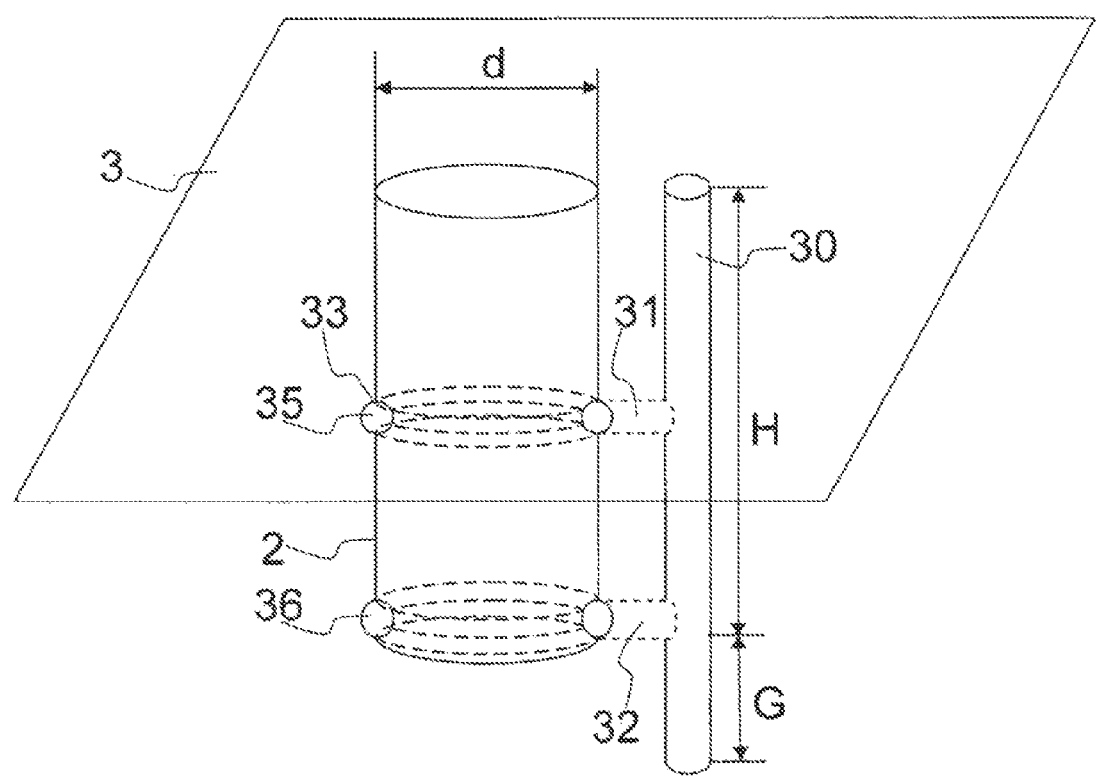
FIG. 2: shows a first intermediate stage when implementing a method for constructing such a system.

The construction of the embodiment is undertaken by mining work which will be described below in brief with reference to FIGS. 2 to 4. Firstly, as shown in FIG. 2, a shaft 30 is sunk to a depth H below the earth's surface. From this shaft two galleries, namely a gallery 32 at depth H and a gallery 31 at depth H/2, are driven forward horizontally close up to the planned cylinder wall 2. From there circular tunnels 35 and 36 are driven into the mountain with a toroidal diameter corresponding to the diameter d of the subsequent lifting piston 2.

If the shaft 30, as illustrated in FIG. 2, is sunk down further by a depth G then it can later serve as the pipeline section 6 or can house same.

Figure 3:
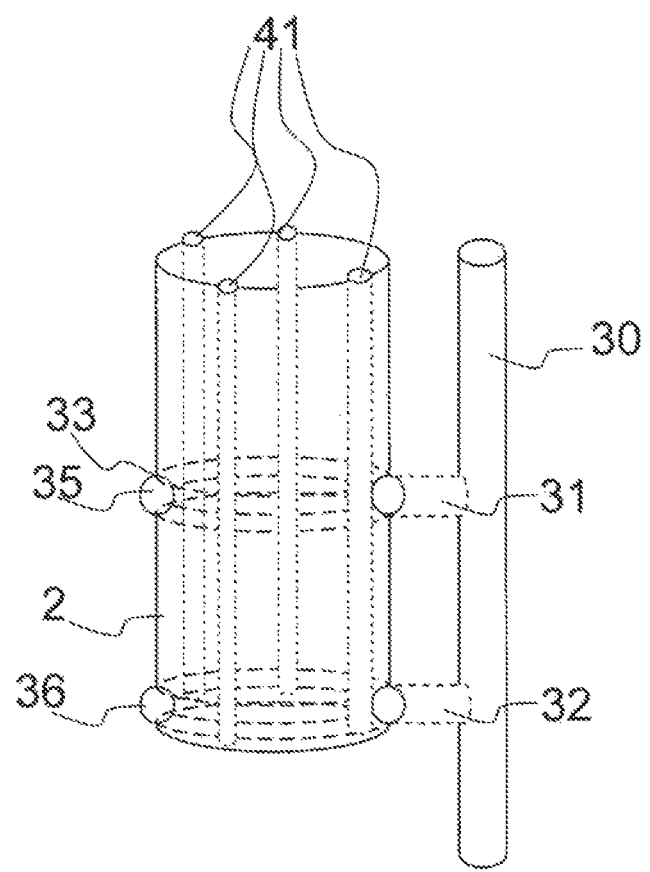
FIG. 3: shows a second intermediate stage when implementing a method for constructing such a system.

Several bores 41, as shown in FIG. 3, are sunk from the earth's surface 3 down to depth H with a relatively small radius. These bore holes 41 serve to introduce stone saws with which the cylinder wall is sawn out.

Figure 4:
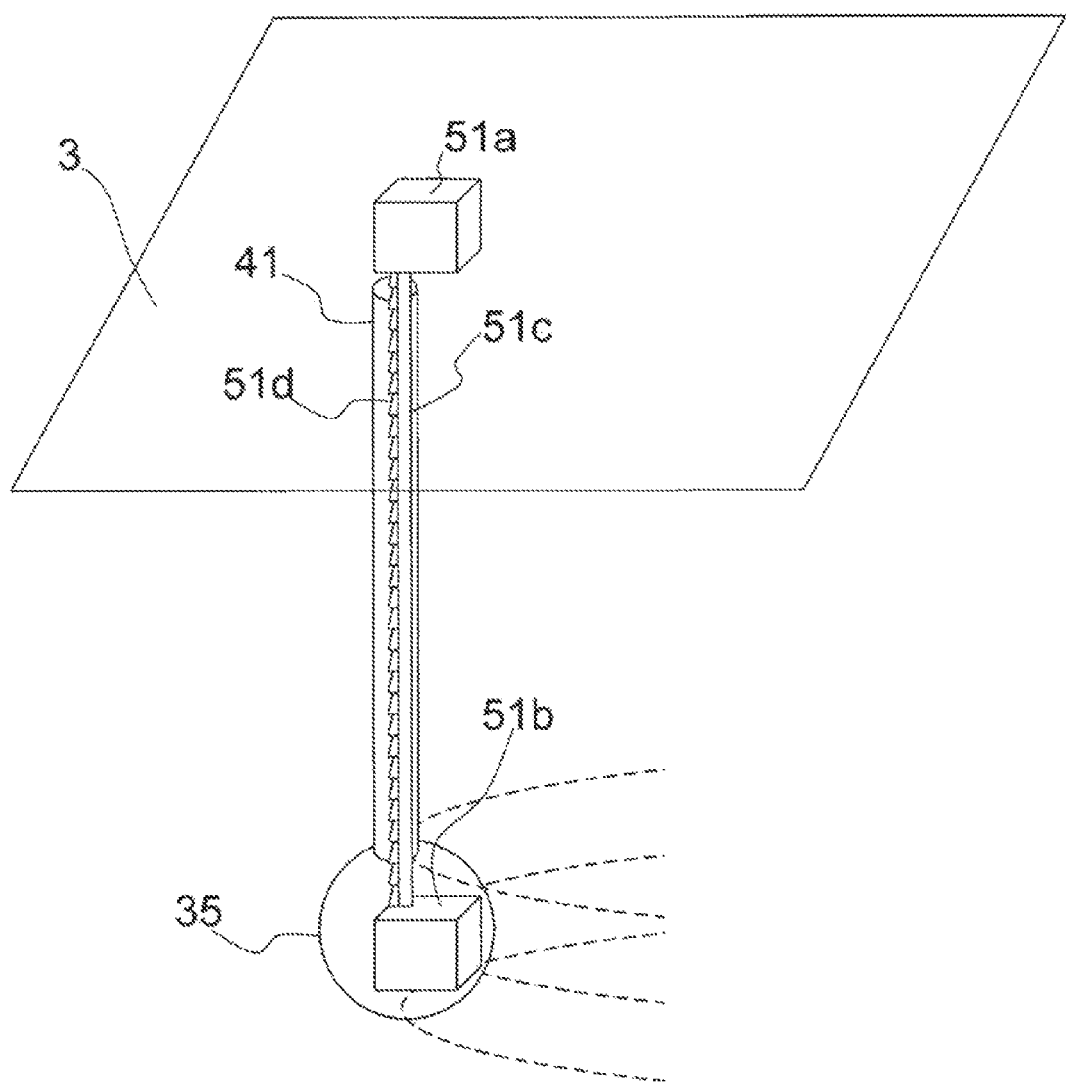
FIG. 4: shows a detailed view of the procedure when sawing out from the rock the mass to be lifted.

FIG. 4 shows how a saw band 51c with saw teeth 51d is tensioned between an upper saw drive 51a, which stands on the earth's surface, and a lower saw drive 51b, which stands in the tunnel 35. The saw band 51c moves driven by the upper and/or lower saw drive 51a, 51b and is guided against the solid rock wall. The rocks are thereby chipped away and removed in the tunnel 35. The saw band 51c can additionally be cooled with water which is introduced at the top using the saw drive 51a. The two saw band drives 51a, 51b are guided on a circular arc which corresponds to the lifting piston 2. The circular shaped cut-out upper lifting piston 2 is thereby formed. This work can be carried out in parallel at all the bore holes 41.

Parallel to this further saw bands are likewise guided through the bore holes 41 from the tunnel 35 to the tunnel 36 and are driven by saw band drives which stand in the tunnels 35 and 36. The lower part of the lifting cylinder is thus cleared. In the case of very tall cylinders further toroidal tunnels can be provided, so that the length of the saw bands does not exceed the technical possibilities.

Parallel to these work operations horizontal bore holes are guided from the tunnel 36, the base tunnel, into the center of the cylinder 2. These holes are filled with explosives and the explosives are then detonated. The rocks in the region of the cylinder base which is hereby formed are thereby broken up and there is no longer any fixed mechanical connection between the cylinder base and the lifting piston.

Parallel to this the tunnel sections 5 and 4 of FIG. 1 are driven forward in order to reach the bottom of the cylinder 2, via which the water can be supplied into the cylinder.

When the sawing work has been completed, the sealing ring 33 is fixed on the lifting piston from the tunnel 35 in FIG. 2. After this the connecting galleries 31 and 32 are closed off in a watertight manner. Water can now be fed in via the pump 8 and thus energy can be stored.

Figure 5:
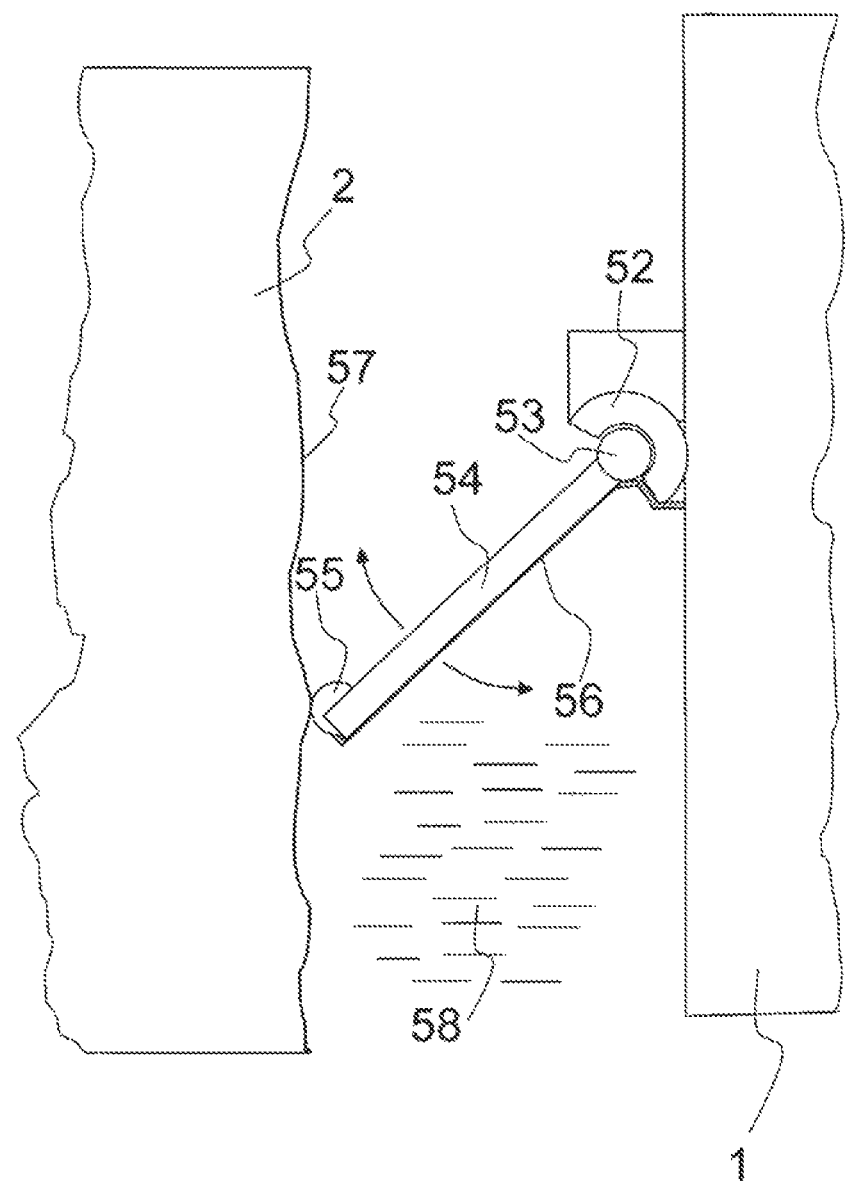
FIG. 5: shows a detailed view of the construction of a sealing ring for such a system.

FIG. 5 shows a sealing ring 33 of preferred structure which can react to balance out irregularities in the wall of the cylinder 2. For this purpose a cylindrical articulated joint 53 is inserted in a cone 52 which surrounds the entire lifting piston 1, which articulated joint supports a lamella plate 54 which, as the result of the water pressure 58, presses with a sealing bead 55 against the surface 57 of the cylinder wall 2 and thereby seals the piston 1 from its surroundings. In order to improve the sealing action a dense flexible material 56 can be attached to the underneath of the sealing lamella plate, which material closes positively with the bead 55 and the piston 51. It should be noted that the lamella plate 54, owing to the long length, which can amount to several kilometers, shows a one-dimensional mechanical behavior.

There now follows a sample calculation for the amount of energy which can be stored by a system having a radius of 500 m. With an assumed average density of the rocks of $\rho_1$=2500 kg/m$^3$ and according to equation (2) an effective density of $\rho_2$=1500 kg/m$^3$, the result from equation (6) is $$E=9.81 \text{ N/kg}*1500 \text{ kg/m}^3*2*3.14*(500 \text{ m})^4$$

or calculated as $$E=5{,}775{,}637{,}500{,}000{,}000 \text{ joules.}$$

Converted into the more usual unit of kilowatt/hour, 1,604,343,750 kWh can be stored in the system. For comparison, the net power production of an average day in Germany amounted to 1,635,000,000 kWh in the year 2009, source BMWI http://bmwi.de/BMWi/Navigation/Energie/Statistik-und-Prognosen/energiedaten.html) (Federal Ministry of Economics and Technology enery statistics)

It is apparent from the calculation that the amount of stored energy is very large in relation to all comparable reservoir power stations using hydropower. The intrusion into the environment is thereby relatively slight. Only water is pumped into the ground, the necessary intrusion into the land surface is slight and is restricted essentially to the surface area of the lifting piston. Said intrusion is readily visible through the lifting, however. A catastrophic breakdown of the system is difficult to conceive since for this the water would have to escape suddenly from the system, which is not possible as a result of the method of construction, such as compared with that of a dam.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A system for storing potential energy, comprising:
   a hydraulic cylinder;
   a solid rock piston disposed in the hydraulic cylinder to be lifted therein, the solid rock piston being cylindrically-shaped and having a height substantially equal to a height of the hydraulic cylinder, wherein a cavity is formed between the solid rock piston and the hydraulic cylinder and wherein the solid rock piston tilts in response to the piston being raised a distance that is more than one half of the height of the hydraulic cylinder; and
   a sealing ring at an edge of the solid rock piston, the cavity between hydraulic cylinder and the solid rock piston being sealed by the sealing ring, wherein the potential energy that is stored by the system corresponds to a product of a mass of the solid rock piston and a height thereof within the hydraulic cylinder.

2. The system for storing potential energy as claimed in claim 1, further comprising:
   one or more ballasts arranged on the upper side of the solid rock piston.

3. The system for storing potential energy as claimed in claim 1, wherein the sealing ring is arranged at a halfway working height (H/2) so that a rolling sealing ring is provided.

4. The system for storing potential energy as claimed in claim 1, wherein a distance that the solid rock piston is lifted in the hydraulic cylinder is less than one half of the height of the solid rock piston.

5. The system for storing potential energy as claimed in claim 1, wherein the hydraulic cylinder is formed in the earth.

6. A system for storing potential energy, comprising:
   a hydraulic cylinder;
   a solid rock piston disposed in the hydraulic cylinder to be lifted therein, the solid rock piston having a height corresponding to a height of the hydraulic cylinder, a diameter corresponding to a diameter of the hydraulic cylinder, and a mass corresponding to a volume of the solid rock piston, wherein a cavity is formed between the solid rock piston and the hydraulic cylinder; and
   a sealing ring at an edge of the solid rock piston, the cavity between hydraulic cylinder and the solid rock piston being sealed by the sealing ring, wherein the potential energy that is stored by the system corresponds to a product of the mass of the solid rock piston and a height thereof within the hydraulic cylinder, wherein the sealing ring has a cone which surrounds the circumference of the solid rock piston and in which a cylindrical articulated joint is inserted which supports a lamella plate which is provided with a sealing bead so that, through the pressure of a hydraulic fluid, the sealing bead is pressed against a surface of a wall of the hydraulic cylinder, with the result that a seal is obtained.

7. The system for storing potential energy as claimed in claim 6, wherein a dense flexible material is attached to the underneath of the lamella plate and closes positively with the sealing bead and the solid rock piston.

8. The system for storing potential energy as claimed in claim 6, further comprising:
   one or more ballasts arranged on the upper side of the solid rock piston.

9. The system for storing potential energy as claimed in claim 6, wherein the sealing ring is arranged at a halfway working height (H/2) so that a rolling sealing ring is provided.

10. The system for storing potential energy as claimed in claim 6, wherein a distance that the solid rock piston is lifted in the hydraulic cylinder is less than one half of the height of the solid rock piston.

11. The system for storing potential energy as claimed in claim 6, wherein the hydraulic cylinder is formed in the earth.

* * * * *